Oct. 14, 1952  A. W. FRAZIER  2,614,074
CHEMICAL SOLUTION FEEDER
Filed Jan. 8, 1951
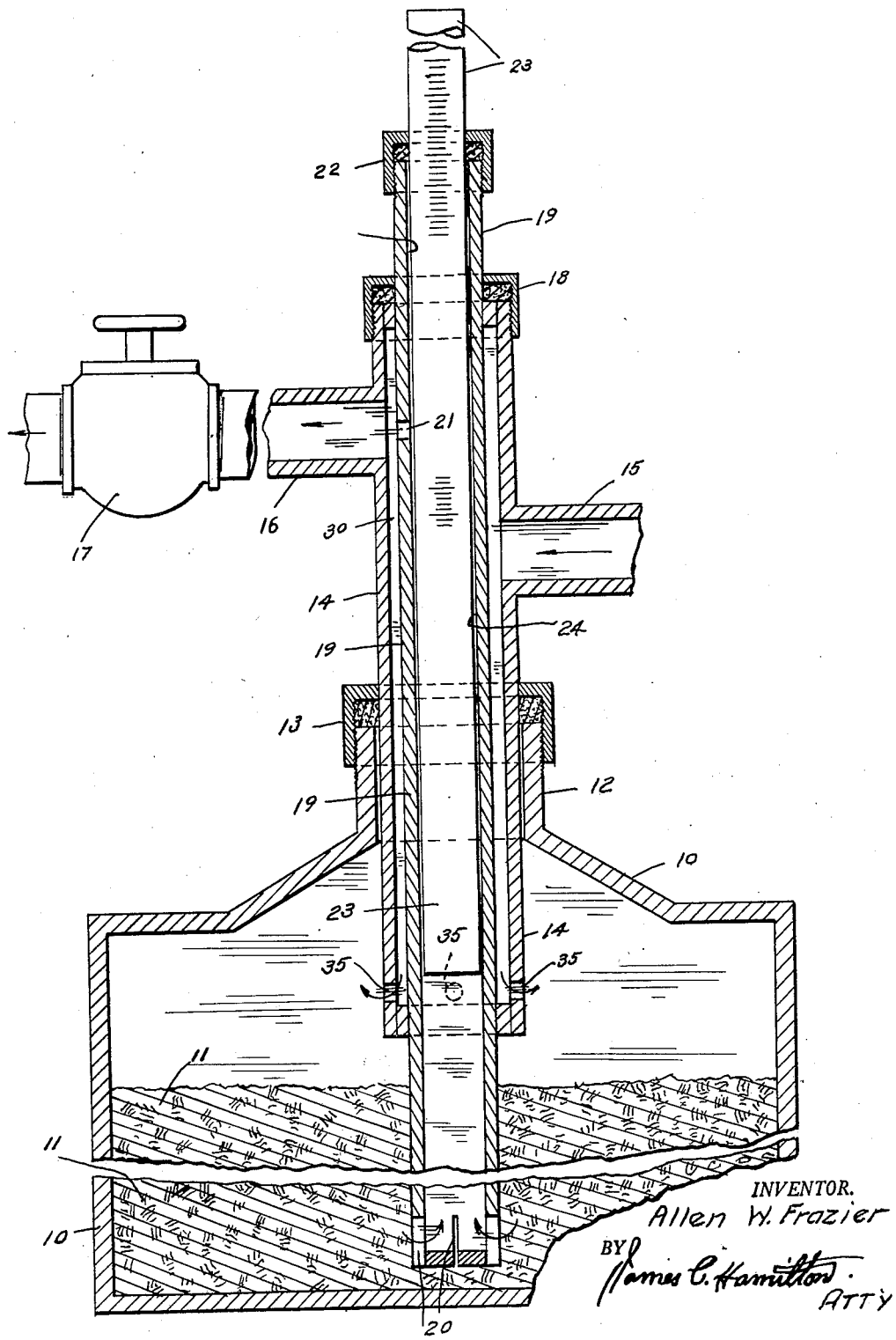
INVENTOR.
Allen W. Frazier
BY James C. Hamilton
ATTY Patented Oct. 14, 1952

2,614,074

UNITED STATES PATENT OFFICE 2,614,074

CHEMICAL SOLUTION FEEDER

Allen W. Frazier, Glen Ellen, Calif.

Application January 8, 1951, Serial No. 204,991

2 Claims. (Cl. 210—36)

My present invention relates to water treating means in which chemical solutions may be proportionately introduced into a water supply line in small or large installations for the purpose of water softening, purification, or for other purposes. The chemical or other matter may be in crystal or other form.

In my present invention automatic proportioning of the chemical solution to the flow of water or other solvent is obtained by so proportioning the fluid volume in an effluent tube that the relation of developed friction to flow responds directly in proportion to the relation developed between the effluent tube orifice and the fluid passing across it.

The principal object of my invention is to provide a means by which a solution of a substance can be proportionately introduced into a flow of its solvent.

Another object is to provide a means for feeding a proportioned chemical substance into a flow of water by using the natural law of physics of intersurface friction developed by flowing fluid.

Another object is to produce a practical means for obtaining precision apportioning of the chemical solution in the water flow, with extreme dilution and small flow, without the use of relatively small orifices, Venturi jets, precision parts or precision control adjustments. Small orifices are subject to blockage by small particles of matter in the water.

Other objects and novel features comprising the construction and operation of my invention will be more apparent as the description of the same progresses.

In the drawing illustrating the invention:

The figure is a symmetrical vertical cross-section of cylindrical form, portions of which are broken off and others shown in elevation, the figure being of diagrammatic showing.

Referring more in detail to the drawing, 10 is a container which may be partially filled with chemical crystals 11 and having a threaded neck portion 12 to which is threaded a packing nut 13. Mounted through the packing nut 13 and container neck portion 12 is a tube 14 which is provided with an inlet portion 15 and an outlet portion 16. The inlet portion 15 may be directly connected with a water supply main. The outlet portion 16 is provided with flow control valve 17 which limits the flow of water to the desired amount from nothing to the capacity of the inlet portion 15. Mounted through a packing nut 18 which is threaded to the upper end of the tube 14 is an effluent tube 19 which is spaced away from the inside walls of the tube 14. This effluent tube 19 is provided at the lower end which extends to a point adjacent the bottom of the container 10 with inlet slots 20 which may be of any form sufficient to prevent small crystals from passing into the tube. In the upper portion of the effluent tube 19 is an orifice 21 which may be of substantial diameter in proportion to the diameter of the effluent tube 19. The upper end of the effluent tube 19 is threaded to receive a packing nut 22. Through the nut 22 is located a rod 23 extending down in the effluent tube 19. The diameter of the rod 23 is slightly smaller than the internal diameter of the effluent tube 19 as indicated by the space 24.

In operation, the inlet portion 15 of tube 14 is connected to the water supply. The water flows through inlet 15 into the chamber 30 located between the outer tube 14 and the effluent tube 19 and passes out through the outlet 16 to the valve 17.

The container 10 is first filled with water after which the tube 14 is inserted and the packing nut 13 adjusted. Water is fed to the interior of the container 10 through orifices 35 located in the lower portion of tube 14. The liquid in the container 10 becomes the chemical solution previously referred to and passes into the interior of the effluent tube 19 through the inlets 20 located in the bottom of the tube. This chemical solution feeds up around the rod 23 and is drawn through the orifice 21 by means of the suction set up by water passing around the rod 23 from the inlet portion 15 to the outlet portion 16. The amount of suction at the orifice 21 may be regulated by rotating the tube 19 from the full position shown in the drawing to a minimum position or a turn of one hundred and eighty degrees. The rod 23 may be raised or lowered in the effluent tube 19 to increase or decrease the surface friction between the inner walls of the effluent tube 19 and outer walls of the rod 23.

It will be apparent that there are three variable adjustments possible to produce the desired results. The three variables are the velocity of water passing around the rod 23 and over orifice 21; the amount of suction across the orifice 21 controlled by the rotation of the effluent tube 19 within the tube 14, and the surface friction between the rod 23 and the effluent tube 19 which is increased or decreased by the vertical adjustment of the rod 23 in the tube 19.

Of course it is to be understood that the proportions of the various parts may be very much altered in some installations over others depending on the volume of water treated. The practical use of the device may vary from a laboratory installation to that used for the purification of a city's water supply and the amount of chemical solution may be admitted to the water flow in measurements of millionths parts.

It is to be understood that I may vary the size and proportions of the device within wide latitude without departing from the spirit of the appended claims.

Having thus described my invention what I claim as new is:

1. An improved liquid chemical solution feeder comprising in combination, a container for holding said solution, a water supply conductor engaged in said container, said water supply conductor having a water inlet and outlet portion located outside of said container, and a water passage chamber located within said container, the said water inlet, outlet and passage chamber portions being interconnected with each other, a tubular liquid conductor member concentrically and longitudinally located in said water chamber, the lower end of said tubular conductor member communicating with the liquid chemical solution in the lower portion of said container, a rod longitudinally adjustable located in said tubular conductor, a liquid chemical solution conductor passage located between the interior wall of said tubular conductor and the exterior wall of said rod, means for admitting continuously flowing liquid chemical solution between said rod and the interior of said tubular conductor to continuously flowing water in said water passage conductor in graduated amounts.

2. An improved liquid chemical solution feeder as set forth in claim 1 in which said means for graduating the flow of liquid chemical solution is further acted upon to increase and decrease the chemical by rotatably adjusting said means in said water supply passage chamber.

ALLEN W. FRAZIER.

REFERENCES CITED

The following references are of record in the file of this patent:

UNITED STATES PATENTS

| Number | Name | Date |
| --- | --- | --- |
| 709,638 | Johnson | Sept. 23, 1902 |
| 1,887,836 | Faber | Nov. 15, 1932 |
| 1,939,938 | Wilson | Dec. 19, 1933 |
| 2,230,004 | Morgan | Jan. 28, 1941 |